Oct. 22, 1968 W. BATES 3,406,474

GESTATION TABULATOR

Filed April 20, 1965 2 Sheets-Sheet 1

INVENTOR.

WILLARD BATES

Oct. 22, 1968 W. BATES 3,406,474

GESTATION TABULATOR

Filed April 20, 1965 2 Sheets-Sheet 2

INVENTOR.
WILLARD BATES

United States Patent Office 3,406,474
Patented Oct. 22, 1968

3,406,474
GESTATION TABULATOR
Willard Bates, Stevensville, Pa. 18845
Filed Apr. 20, 1965, Ser. No. 450,572
6 Claims. (Cl. 40—110)

ABSTRACT OF THE DISCLOSURE

A gestation tabulator for dairy cows having two superposed concentrically mounted disks housed within a frame. The disks contain information and dates which are related to the gestation cycle of a cow. The rear disk is rotated incrementally with respect to the front disk to expose calendar dates carried by the rear disk.

This invention is an animal gestation tabulator designed for use by dairy farmers to enable them to keep track of the gestation cycles and breeding records of the individual cows in a dairy herd.

One object of the invention is to provide a tabulator of the character described which will enable a dairy farmer to determine at a glance the status of the gestation cycle of each cow in his herd.

Another object of the invention is to provide a tabulator of the character described in which provision is made for operatively associating indicator pins respectively identifying individual cows in a herd, with the respective day date space on a rotatable calendar disk corresponding to the date on which a given cow was bred, so that as the calendar disk is incrementally moved day by day relative to a stationary chart bearing appropriate indicia pertaining to successive phases in the gestation cycle, the daily status of the gestation cycle of any cow in the herd may be readily ascertained.

Figure 1:
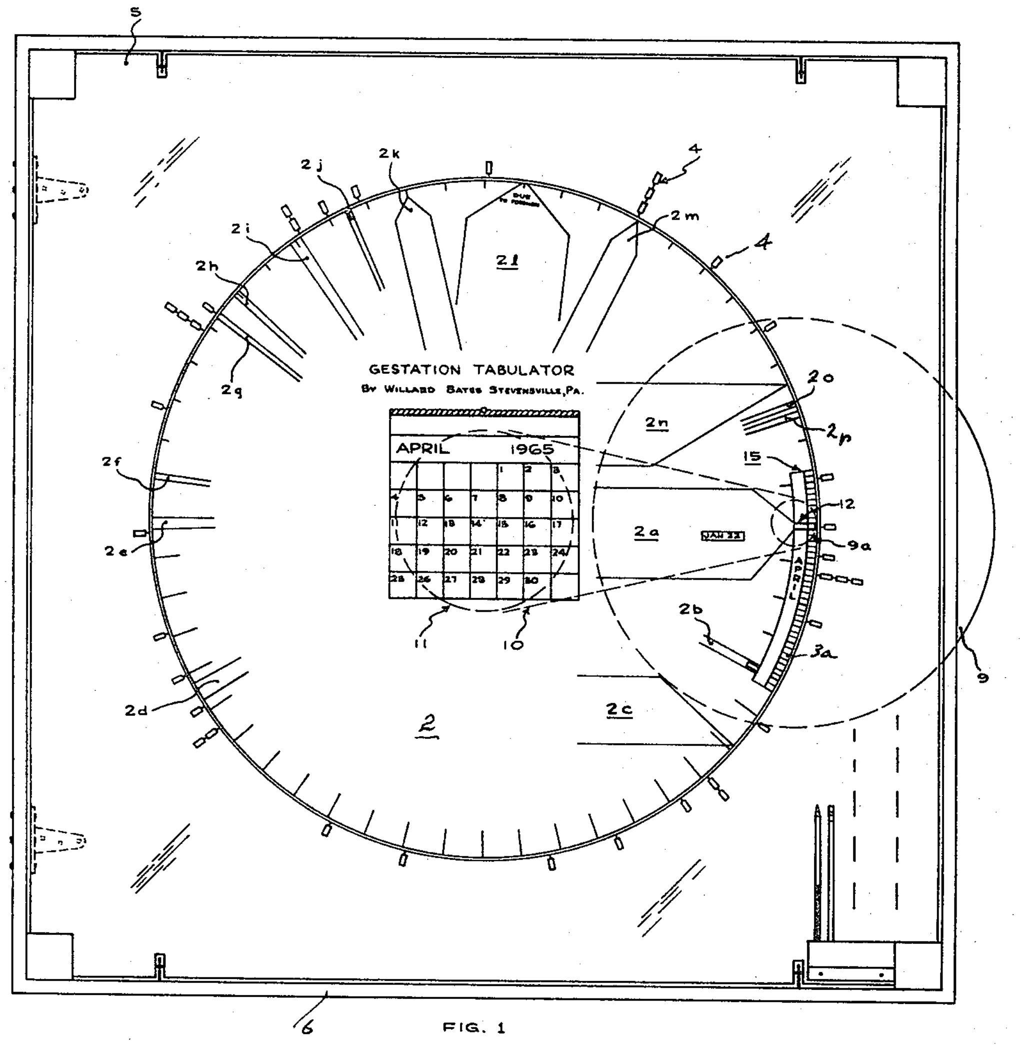
Figure 4:
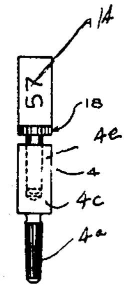
Figure 3:
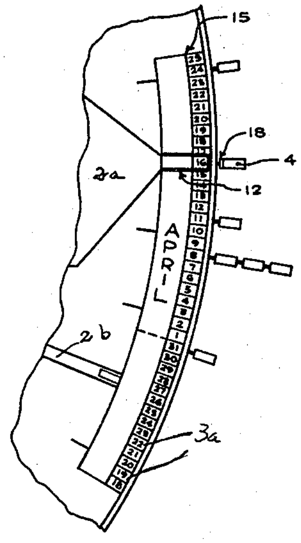
Figure 2:
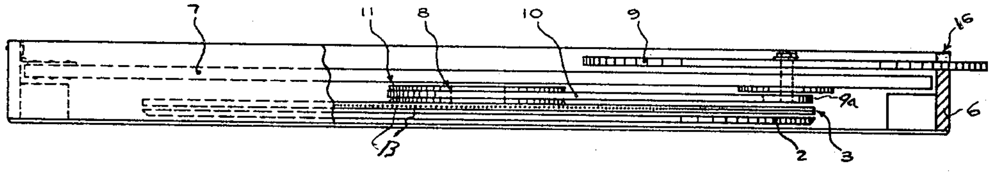

These and other objects of the invention will become apparent from the following specification when read in the light of the accompanying drawing wherein I have illustrated a preferred form of my invention and wherein FIGURE 1 is a front view of the tabulator showing the superposed disks mounted within a housing, FIGURE 2 is a top view of the device of FIGURE 1 with a portion of the housing broken away and showing the superposed arrangement of the disks, FIGURE 3 is an enlarged fragmental view of the device showing the cutaway portions of the front disk to expose the calendar dates on the rear disk, and FIGURE 4 is an enlarged detail view of the cow indicator pins showing the manner in which two or more pins may be stacked for association with the same day date on the calendar disk.

As shown in the drawings the tabulator comprises a pair of concentrically mounted disks 2 and 3 mounted in superposed relation within a housing 6 for relative coaxial motion. The housing 6 includes a frame closed at the rear by a back board 7 to which the front disk 2 is stationarily secured by a centrally disposed hub portion 8 which positions the front disk forwardly of and in spaced relation to the back board 7. The rear disk 3 is mounted for rotation on said hub portion 8 within the space between the back board and the stationary front disk 2. The front of the housing is closed by a transparent sheet of clear plastic 5, and the shell or frame of the housing 6 may be hingedly connected to the back board as shown to provide access to the interior of the housing when necessary.

The rear disk 3 carries an annular series of day date spaces 3*a* circumferentially spaced about the periphery thereof, there being 365 such spaces representing the days of a calendar year. The disks 2 and 3 are of substantially the same diameter as shown, so that the day date spaces on the rear disk are concealed from view by the front disk except for a portion which is exposed and visible through a cutout portion 15 provided in the periphery of the front disk 2. The arcuate extent of the cutout 15 is such as to expose slightly more than one month of day date spaces on the rear disk 3.

I provide on the front disk 2 means for accurately identifying a given day date space on the rear disk, such as an apertured member 12 extending radially from the edge of the disk 2 at the cutout portion 15 thereof and positioned to overlie the annular series of day date spaces on the exposed portion of the rear disk, with the aperture in the member 12 in register therewith so that any of the day date spaces on the disk 3 may be brought in register with said aperture. As shown the member 12 may be formed from wire provided with a loop as shown.

Cow identifying pins 4 such as shown in FIG. 4 are arranged to be operatively and selectively associated with the day date spaces corresponding to the respective dates on which the several cows of the herd have been bred. To this end the peripheral edge of the rear disk 3 is provided in register with each day date space with a radial socket or hole 13 into which the shaft or shank end 4*a* of an indicator pin may be inserted, as shown in FIG. 1. The individual "cow" pins as shown in FIG. 4 are multi-sided to provide plural facets or faces 4*c* on which are inscribed a number or other identifying indicia 14 assigned to a particular cow. The pins are adjustable within said sockets about their respective axes to expose either face for viewing through the transparent front. The several facets or faces 4*c* of each pin may be colored according to a given code to indicate different status conditions in the gestation cycle. In order to associate more than one "cow" pin with a given day date, the end of the pin opposite that carrying the shaft or shank is provided with a pin-receiving socket 4*e* so that a second "cow" pin may be inserted therein. The "cow" pins may be triangular in cross section to thus provide 3 facets each.

Furthermore, means such as ring members or perforated disks 18 may be provided for association with any of the "cow" pins as shown in FIG. 4 to indicate known ailments or abnormalities of any of the cows. These disks or rings may be of different colors in accordance with a known code to indicate the particular ailment with which the cow may be afflicted, and the apertured center is dimensioned to fit snugly upon the shaft or shank of a "cow" pin as shown.

The rear disk is designed to be moved incrementally each day a distance corresponding to one day date space on the annular series of date spaces provided on the periphery thereof. To this end a smaller disk 9 is rotatably mounted on the back board in a position to have an operating edge portion thereof extend beyond the edge of the housing frame through a cutout 16 provided therein as shown in FIG. 2. This disk carries a small pulley 9*a* arranged to drive the rear disk 3 through the means of a belt 10 which is trained over said small pulley and over a larger pulley 11 carried by the rear portion of the rear disk 3. Thus the disk 3 may be turned upon the hub portion 8 of front disk 2 day by day without need of opening the housing 6.

When in use the diary farmer places the several "cow" pins in holes corresponding to the day date on which the cows have been bred and thereafter, by operating the disk 9 to incrementally turn the rear disk 3, each day, one day space the several "cow" pins will move with the disk and successively encounter each of several "check points" indicated at 2A through 2P on the front disk. These "check points" may be in the form of blocks of printed matter properly oriented with respect to the day date indicator 12, to give to the dairyman successive bits of vital information correlated to the successive phases of the gestation cycle. The printed matter may be applied to adhesively coated labels for ready attachment to the face of the front disk.

Having thus described my invention it is apparent that I have provided a simple but efficient and accurate tabulator, which will operate to advise the dairy farmer day by day of the status of the gestation cycle of every cow in his herd and thus preclude the loss of valuable animals due to failure to provide the care required by the varying condition of the animal as the gestation cycle progresses.

What I claim is:

1. An animal gestation tabulator comprising two superposed concentrically mounted disks, means providing relative coaxial motion between said disks, the rear disk having a series of equally spaced pin receiving holes extending radially inwardly from the periphery thereof, a circular marginal zone of the face of said rear disk bearing a series of circumferentially spaced successive calendar day dates representing days of a calendar year, the spacing of said day dates being equal to the spacing of said holes and radially aligned therewith, said front disk having an arcuate peripheral cut-out sufficient to expose a predetermined number of said successive day dates therethrough, the face of said front disk being provided with circumferentially spaced blocks of indicia representing check points relative to a gestation cycle, a plurality of indicator pins respectively disposed in said holes and movable with said disks, each of said pins carrying indicia identifying a particular animal of a herd, and means to indicate a particular day date of the succession of day dates to which the rear disk has been turned.

2. An animal gestation tabulator as described in claim 1 including a housing having a transparent front face and means for mounting said disks within said housing for relative rotation with respect to each other.

3. An animal gestation tabulator as described in claim 1 wherein the indicator pins are provided with plural indicia bearing facets and are rotatably adjustable in the pin supporting holes of the rear disk, to present either of said facets in position for viewing together with the indicia on said front disk.

4. An animal gestation tabulator as described in claim 1 wherein the indicator pins are respectively provided with pin receiving sockets in the outer ends thereof, said sockets each being dimensioned to receive and support another indicator pin.

5. An animal gestation tabulator as described in claim 3 wherein colored identifying ring members are removably fitted on said indicator pins between the faceted portion thereof and the portion of the pin which is received in the pin receiving holes in the periphery of the rear disk, the color of the ring members being a coded indication of an animal's physical condition.

6. An animal gestation tabulator as described in claim 1 wherein the day date indicator means is carried by said front disk and is disposed thereon to overlie the cut-out portion thereof and is provided with an apertured portion designed to register with a desired day date space on the exposed portion of the rear disk as the rear disk is incrementally rotated.

References Cited

UNITED STATES PATENTS

| | | | |
|---|---|---|---|
| 512,012 | 2/1894 | Phillips | 40—70 X |
| 1,602,170 | 10/1926 | Ricca | 40—70 |
| 2,098,933 | 11/1937 | Hathaway | 40—70 |
| 2,681,523 | 6/1954 | Sellers | 40—70 |

EUGENE R. CAPOZIO, *Primary Examiner.*

W. J. CONTRERAS, *Assistant Examiner.*